(12) United States Patent
Machuca Martinez et al.

(10) Patent No.: US 8,425,755 B2
(45) Date of Patent: Apr. 23, 2013

(54) PROCESS TO REDUCE THE CHEMICAL OXYGEN DEMAND, TOTAL ORGANIC CARBON, AND TOTAL SOLIDS IN VINASSE BY ELECTRO-FLOTATION/OXIDATION

(75) Inventors: Fiderman Machuca Martinez, Santiago de Cali (CO); Nilson de Jesus Marriaga Cabrales, Santiago de Cali (CO); Javier Andres Davila Rincon, Santiago de Cali (CO)

(73) Assignee: Universidad Del Valle, Santiago de Cali (CO)

( * ) Notice: Subject to any disclaimer, the term of this patent is extended or adjusted under 35 U.S.C. 154(b) by 54 days.

(21) Appl. No.: 13/133,227

(22) PCT Filed: Dec. 18, 2009

(86) PCT No.: PCT/IB2009/055854
§ 371 (c)(1),
(2), (4) Date: Jun. 7, 2011

(87) PCT Pub. No.: WO2010/070622
PCT Pub. Date: Jun. 24, 2010

(65) Prior Publication Data
US 2011/0233070 A1    Sep. 29, 2011

(30) Foreign Application Priority Data
Dec. 19, 2008    (CO) .................................. 08 135448

(51) Int. Cl.
*C02F 1/46*    (2006.01)
(52) U.S. Cl.
USPC ............ 205/688; 205/742; 205/757; 205/761

(58) Field of Classification Search .................. 205/688, 205/742, 757, 761
See application file for complete search history.

(56) References Cited

U.S. PATENT DOCUMENTS

| 4,131,526 | A | 12/1978 | Moeglich |
| 4,834,852 | A | 5/1989 | Wabner |
| 2004/0140218 | A1* | 7/2004 | Gavrel et al. ................. 204/660 |

FOREIGN PATENT DOCUMENTS

WO    0017113    3/2000

OTHER PUBLICATIONS

Decloux et al., Interest of electrodialysis to reuce potassium level in vinasses. Preliminary experiments. Desalination 146 (2002) pp. 393-398.
Holt et al., Electrocoagulation as a Wastewater Treatment, The Third Annual Australian Environmental Engineering Research Event. Nov. 23-26 Castlemaine, Victoria 1999.
Kannan et al., Comparison of treatment potential of electrocoagulation of distillery effluent with and without activated Areca catechu nut carbon. Journal of Hazardous Materials B137 (2006) 1803-1809.
Koparal and Ogutveren, Removal of nitrate from water by electroreduction and electrocoagulation. Journal of Hazardous Materials B89 (2002) 83-94.
Milewski and Lewicki, Demineralisation of Vinasse by Electrodialysis. Journal of Food Engineering 7 (1988) 177-196.

(Continued)

*Primary Examiner* — Arun S Phasge
(74) *Attorney, Agent, or Firm* — Reed Smith LLP (57) ABSTRACT

The invention relates to a novel process for reducing the chemical oxygen demand (COD), total organic carbon (TOC) and total solids of non-contaminating residues from ethanol distilleries, by means of electro-flotation/oxidation techniques using an electrolytic cell outfitted with galvanized steel electrodes as a function of the initial pH of the medium, the current density and the concentration of $H_2O_2$.

6 Claims, 5 Drawing Sheets

(A)

(B)

OTHER PUBLICATIONS

Parga, et al. Arsenic removal via electrocoagulation from heavy metal contaminated groundwater in La Comarca Lagunera Mexico. Journal of Hazardous Materials B124 (2005) 247-254.

Chen et al., Separation of pollutants from restaurant wastewater by electrocoagulation. Separation and Purification Technology 19 (2000) 65-76.

Yavuz, EC and EF processes for the treatment of alcohol distillery wastewater. Separation and Purification Technology 53 (2007) 135-140.

Yilmaz et al., The investigation of parameters affecting boron removal by electrocoagulation method. Journal of Hazardous Materials B125 (2005) 160-165.

Zayas et al., Applicability of coagulation/flocculation and electro-chemical processes to the purification of biologically treated vinasse effluent. Separation and Purification Technology 57 (2007) 270-276.

* cited by examiner

PROCESS TO REDUCE THE CHEMICAL OXYGEN DEMAND, TOTAL ORGANIC CARBON, AND TOTAL SOLIDS IN VINASSE BY ELECTRO-FLOTATION/OXIDATION

RELATED APPLICATIONS

This application is the United States National Stage of International Application No. PCT/IB2009/055854, filed Dec. 18, 2009, which was published as International Publication No. WO 2010/070622, and which claims benefit of Columbian Patent Application No. 08 135448 filed Dec. 19, 2008. Both applications are incorporated by reference in their entirety herewith.

FIELD OF THE INVENTION

The current invention is related to a novel process to reduce the chemical demand of oxygen (CDO), total organic carbon (TOC), and total solids of non-contaminating residues from ethanol distilleries by techniques of electro-flotation/oxidation.

BACKGROUND OF THE INVENTION

The emergence of ethanol distilleries in sugar mills has increased the production of vinasse as a residue, since its characteristics impede direct dumping onto water sources given its elevated organic load, mineral salts, high values of chemical and biological oxygen demand (COD and BOD), turbidity, and color (Garcia A., Rojas C., 2006). In Colombian distilleries, vinasse may present a COD above 130,000 mg/L, given that such is concentrated by evaporation prior to being subjected to composting treatment. The concentration is a high-energy demand unitary operation within an alcohol production plant and as a result of the process of concentration of the vinasse the alcohol production capacity in economic terms is affected. Additionally, the potassium, calcium, and magnesium salts in these wastes permanently cause incrustation problems on heat transfer equipment, which leads to high costs of the process.

For the treatment of residual waters, in general, the electro-coagulation technique has been used in which the contaminants from the effluents are removed through the application of electric current (electromotor power) that generates the destabilization of the particles of contaminants that are suspended, emulsified, or dissolved in the aqueous medium. Because of a series of chemical reactions, the contaminants form hydrophobic components that precipitate or float, facilitating their removal via secondary separation methods, such as electro-flotation (Holt, et al., 2005).

Electro-coagulation/electro-flotation (ECF) is an alternative for treatment of residual waters that has shown important results in the removal of contaminants. For example, removal efficiency up to 99.9% has been accomplished in COD by using an ECF combined system in the treatment of residual waters from restaurants (Xueming, et al., 2000). In electro-coagulation of residual waters from the textile industry removal of turbidity and COD has been accomplished up to 98% and 75%, respectively (Mehmet K., Orhan T., Mahmut B., 2003), also, the removal of boron from residual waters by using electro-coagulation with $CaCl_2$ has reported efficiency up to 97% (Yilmaz, et al., 2005). The removal of nitrates via electro-coagulation and electro-reduction has reached removal of 68% (Koparal S., Ogutveren B., 2002) and in removal of arsenic from underground waters contaminated with heavy metals has reported efficiency of 99% (Parga, et al., 2005).

As for treatment of vinasse-type wastes diverse electrochemical methods have conventionally been applied, seeking to mitigate possible contaminant effects. This is how through electro-dialysis, researchers have reached a reduction of 80% in salt content with complete removal of potassium (<1 $mg/dm^3$) (Janusz, et al., 1988). And through the combination of electro-dialysis with membranes of cationic exchange, it has been possible to diminish the concentration of salts by 98% (Decloux, et al., 2002).

Through electro-coagulation combined with activated carbon *Areca catechu* nuts, reduction of COD was accomplished above 80% (Kannan, et al., 2006). Likewise, through a stage of conventional chemical coagulation/flocculation and then a stage of catalytic electro-oxidation with Ti/RuPb(40%)Ox and Ti/PtPd(10%)Ox electrodes on biologically treated vinasse reduction of 97% COD was accomplished (Zayas, et al., 2007). Through electro-coagulation using a support electrolyte and gradually adding hydrogen peroxide, a 90% reduction of total organic carbon (TOC) was reported (Yusuf Y. et al., 2007).

Generally, the use of electrochemical techniques and membranes of ionic exchange reduce the deposition of salts on exchange tubes during vinasse concentration, presenting percentages of concentration and demineralization of salts between 98% and 80%, respectively [Decloux M. et al., 2002; Milewski J. et al., 1988].

These electrochemical techniques to treat vinasse have been implemented as post-treatment after the application of techniques like chemical coagulation, separation with membranes, or anaerobic reaction to significantly reduce COD. However, the vinasse previously treated present low electrical conductivity, evidencing increased electrical consumption with the electrochemical treatment.

In Valle del Cauca, vinasse has been treated through several ways to give it different uses, for example, in agriculture it has been used in composting and it has been concentrated for use as a fertilizer or as raw material to fabricate cellular protein and animal feed; however, these applications have disadvantages because of the prolonged storage times required, the costly investments, and the operation difficulties in the processes [Dávila R., 2008].

There are different techniques that use electrolytic cells for decontamination of effluents, for example, U.S. Pat. No. 4,131,526 shows a process of residual water oxidation through electrolysis using stainless steel, graphite, or titanium electrodes coated with ruthenium dioxide or manganese and alternate current in a range of 0.5 to 800 Hz, in the presence of a powdered oxidizing catalyst like germanium oxide, chrome, lead, antimony, bismuth, molybdenum, tungsten, manganese, and rhenium. The publication includes the generation of hydrogen peroxide through electrolysis of water for consumption in oxidation reactions taking place on the contaminants.

U.S. Pat. No. 4,834,852 describes a process to treat toxic contaminants in an electrolytic cell with a current density of 0.5 to 50 $mA/cm^2$ in the presence of hydrogen peroxide at a concentration of 0.5 to 10 mg/L per unit of COD and pH below 8. The cathode of the dielectric cell is elaborated in steel, titanium, nickel, or graphite and the anode is elaborated in graphite or DSA with titanium or zirconium valves. Patent WO 00/17113 reveals a process to treat liquid media contaminated with polychlorobenzene (PCB), aromatic hydrocarbons, metallic traces, pesticides, and halogenated, among other contaminants. The process comprises: (a) the prior desorption of organic and organometallic compounds of the sediments, (b) adjustment of the pH of the contaminated fluid to a value between 2 and 6, (c) the application of current with a voltage of 0.5 to 15 volts, current density of 0.002-0.05 A/cm² and a rate of reverse polarity of 0.01 to 5 cycles/s in an electrolytic cell outfitted with sacrifice electrodes elaborated in iron or low-carbon steel at room temperature, (c) injection of a hot hydrogen peroxide solution into the cell to a concentration below 100 ppm hydrogen peroxide ($H_2O_2$) in the medium, and (d) the separation of insoluble and flocculated particles from the liquid effluent through gravity, filtration, or centrifuge.

Unexpectedly, the current invention designs and develops a process for reduction of COD, TOC, and total solids in vinasse from ethanol distilleries without recurring to preliminary treatment of the substrate through electro-flotation/oxidation treatment using an electrolytic cell provided with galvanized steel electrodes, preferably under basic conditions, current density of 20 to 40 mA/cm² and in the presence or absence of hydrogen peroxide.

Through the novel and inventive process, the best results are achieved in terms of the percentage of removal of total solids (% RTS) and this better performance is obtained by adding $H_2O_2$ during electro-flotation/oxidation operations when using galvanized steel electrodes, low current density (20-40 mA/cm²) and operating under basic conditions, obtaining a 58% reduction of COD and 57% reduction of TOC.

The advantages of the process lie in that the galvanized steel applied as electrode material in ECF processes to treat vinasse permits achieving high removal of COD, TOC, and turbidity, furthermore, this material is economic and easily obtained compared to electrodes fabricated from more complex alloys.

Also, low current densities are required, which favors energy consumption in the process and the low values of initial pH of the solution and hydrogen peroxide concentration directly influence in the reduction of economic costs of the operation, obtaining considerable removal of TOC and COD.

OBJECTS OF THE INVENTION

The invention deals with a process to reduce COD, TOC, and total solids in vinasse from ethanol distilleries by means of electro-flotation/oxidation treatment using an electrolytic cell outfitted with galvanized steel electrodes in function the initial pH of the medium, current density, and concentration of $H_2O_2$.

Particularly, the current invention corresponds to a process for reducing COD, TOC, and total solids of vinasse without prior treatment by means of electro-flotation/oxidation in an electrolytic cell provided with galvanized steel electrodes in the presence of $H_2O_2$, basic pH, and low current density, preferably.

DETAILED DESCRIPTION OF THE INVENTION

The electrolytic cell used in the invention process is composed of a treatment chamber, an input, an output, one or more pairs of electrodes elaborated from galvanized steel placed vertically in said treatment chamber to facilitate the rise of the bubbles formed by the electrolysis, a power source connected to the pairs of electrodes, a rheostat device to control the foam level, a system to collect the supernatant, and an agitation system. Likewise, the preferred shape of the electrolytic cell is cylindrical to favor the agitation of the contaminated medium.

Vinasse from ethanol distilleries present elevated organic load, mineral salts, high values in chemical oxygen demand and biological oxygen demand (COD and BOD), turbidity, and color. However, through the novel process designed, prior treatment is not required to obtain reduction of COD, TOC, and total solids.

The process to reduce COD, TOC, and total solids in vinasse from ethanol distilleries of the invention comprises the following stages:
  a) Feed an electrolytic cell provided with galvanized steel electrodes with a contaminated liquid medium from ethanol distilleries.
  b) Adjust the pH from the contaminated liquid medium to a value between 7 and 14, preferably between 9 and 11.
  c) Keep said contaminated liquid medium at room temperature.
  d) Apply a constant current through said electrodes at a density between 20 and 40 mA/cm² to said contaminated liquid medium.
  e) Inject a solution of liquid hydrogen peroxide into said contaminated liquid medium via continuous or sequential injection in a plurality of sites near said electrodes in a concentration between 10 and 67,000 ppm of $H_2O_2$ per liter of contaminated liquid medium, preferably between 1000 and 67,000 ppm of $H_2O_2$ per liter of contaminated liquid medium.
  f) Remove the treated effluent from said electrolytic cell.
  g) Carry out a post-treatment stage to the effluent in which said purified effluent is separated from the flocculated and insoluble particles through gravity, filtration, or centrifuge.

The following examples present experimental tests that show the advantages of the invention procedure compared to results from conventional techniques that employ electrolytic cells with iron or aluminum electrodes and high current densities to reduce the load of contaminants in residual industrial waters.

EXAMPLE 1

A Taguchi $3^4$ experimental design was implemented to evaluate the effect of the initial pH (4.0, 7.0, and 9.0), current density (20, 40, and 60 mA/cm²), NaCl concentration (0.0, 2,000, and 4,000 ppm), and $H_2O_2$ concentration (20,000, 40,000, and 60,000 ppm). Measurements of COD were performed for samples showing greater TOC reduction.

An acrylic cylindrical electrolytic cell was used to favor agitation. The cell is 8 cm deep and 12 cm in diameter. The electrodes used were elaborated in iron, aluminum, and galvanized steel, in laminar form 4 cm wide, 10 cm long, and 1 mm thick, to be submerged at a 4 cm depth (wet area=32 cm$^2$/electrode).

Current density was kept constant by continually adding vinasse to keep the level in the cell invariable. The equipment used also presents a platform inclined over the platform sustaining the cell and where the foam formed is gathered. The cell has a system for foam removal controlled by a rheostat.

The electrodes were connected to a GPS-S 3030D power source (GW Instek), which permits working to maximum of 3 amps and 30 volts. The electrodes were held on the top part of the cell by a support and they were placed vertically to facilitate the rise of bubbles formed by the electrolysis.

The samples of vinasse used in the experiment were taken from the discharge of the concentration system in a local distillery.

The physiochemical characteristics of the vinasse used are shown in Table 1; during the development of the test, all samples remained refrigerated.

TABLE 1

Physicochemical characteristics of the vinasse

| Parameter | Magnitude |
| --- | --- |
| COD, mg/l | 214.00 |
| TSS, mg/l | 21,625 ± 2,033 |
| pH | 4.3 |
| Turbidity, NTU | 590 |
| Conductivity, dS/cm | 28 |
| CaO, % p/p | 0.58-1.18 |
| MgO, % p/p | 0.27-0.66 |
| K$_2$O, % p/p | 1.50-1.87 |
| Fe, ppm | 110-170 |
| Mn, ppm | 60-100 |
| Zn, ppm | 7.50-45.66 |

The vinasse was centrifuged before each test and then measured to determine the TOC level and the pH behavior, the conductivity of the foam and the clarified (remnant liquid in the cell after centrifuge), as well as the loss of weight of the anode (detached mass). The behavior of the voltage and the temperature were also registered and after each test, the level of TOC carbon was determined. The initial pH was adjusted using a solution of NaOH 0.7 M and H$_2$SO$_4$.

The pH and the electrical conductivity of the samples were determined with a pH meter (AB15 ACCUMET Basic-Fisher Scientific) and a conductivity meter (EUKELKAMP 18.21 Maser LTDA). The content of total solids was determined by drying a part of each sample in a furnace at 105° C. Turbidity measurements were obtained with a turbidity meter by HACH model 2100A. TOC measurements were carried out with a SHIMADSU TOC5050 equipment conducting dilutions in distilled water at 1:1,000.

COD measurements were carried out in HACH COD Reactor equipment conducting dilutions in distilled water at 1:1,000.

Upon evaluating the behavior of the electrodes elaborated in different materials, (aluminum, iron, galvanized steel) with DC of 20 mA/cm$^2$, 60,000 ppm of H$_2$O$_2$ and pH=10.5, it was observed that the galvanized steel presented the best performance in terms of percentage (%) of removal of total solids (% RTS) with percentages over 57%, against 47% and 40% of the iron and aluminum electrodes, respectively. This behavior is because the iron cations catalyze the hydrogen peroxide to carry out Fenton reactions, which contribute to the degradation of organic matter.

Likewise, when assessing the effect of the H$_2$O$_2$ concentration in function of current density and pH, the greatest percentages (%) of RTS were obtained using the galvanized steel electrodes at an initial pH of 10.5 and H$_2$O$_2$ concentration of 60,000 ppm. Furthermore, the best removal was achieved when using H$_2$O$_2$ to promote Fenton reactions using low current densities (20 mA/cm$^2$).

EXAMPLE 2

An experimental design 2$^3$ was implemented with replicas at the central point using galvanized steel electrodes and the effect of: initial pH, DC, [H$_2$O$_2$] and the interactions were evaluated. Prior to the tests, the zinc layer of the anode was removed through electrolytic means to avoid passivation of the electrode.

The process evaluated the effect of the current supplied over the detached mass of the anode in galvanized steel with which it was possible to establish that the detached mass of the anode is proportional to the current supplied, obtaining the highest percentages (% RTS) when less mass of the anode is detached, i.e., at a DC of 20 mA/cm$^2$. This phenomenon is attributed to the fact that the application of high current densities (<50 mA/cm$^2$) increases the size of the bubbles produced in the electrodes, which generates an alteration in the process of removal of solids by flotation diminishing the percentage of RTS.

Through this comparative example, it was established that the electro-flotation/oxidation process presents better performance when adding H$_2$O$_2$, using galvanized steel electrodes, low current density (20-40 mA/cm$^2$), and operating under basic conditions, obtaining a 58% reduction of COD and 57% reduction of TOC for the process developed under these conditions.

EXAMPLE 3

For this test, a 500-ml electrolytic cell was used with a rate of agitation of 110 rpm outfitted with galvanized steel electrodes in monopolar arrangement connected to a GPS-S Series INSTEK analog digital type current source. The electrodes provide an area of 32 cm$^2$ separated by 1 cm.

An L$_9$(3$^3$) design was carried out, i.e., 9 experimental tests with three variables at three levels. The design proposed is an orthogonal arrangement, meaning that for each pair of columns there are all the possible combinations of the levels chosen and their factors. Table 2 shows the factor and its levels, and Table 3 shows their combination for the design.

TABLE 2

Conditions for Taguchi method operation

| Variable | Factor | Levels | | |
| --- | --- | --- | --- | --- |
| | | 1 | 2 | 3 |
| [H$_2$O$_2$] (ppm) | (A) | 20,000 | 40,000 | 60,000 |
| Initial pH | (B) | 4 | 7 | 10 |
| DC mA/cm$^2$ | (C) | 20 | 40 | 60 |

TABLE 3

| | Combination of factor and levels | | |
|---|---|---|---|
| | | Levels | |
| Test | [$H_2O_2$] (ppm) (A) | Initial pH (B) | DC mA/cm$^2$ (C) |
| (1) | 20,000 | 3.95 | 20 |
| (2) | 20,000 | 7.01 | 40 |
| (3) | 20,000 | 10.14 | 60 |
| (4) | 40,000 | 3.79 | 40 |
| (5) | 40,000 | 7.22 | 60 |
| (6) | 40,000 | 9.02 | 20 |
| (7) | 60,000 | 3.97 | 60 |
| (8) | 60,000 | 7.01 | 20 |
| (9) | 60,000 | 10.23 | 40 |

At the end of the test, foam was obtained at the top of the electrolytic cell—a product of the phenomenon of electroflotation—and a clarified corresponding to the remnant liquid. The final pH was measured and conductivity for the foam and the clarified was calculated through the percentage of total solids (% TS) according to Equation (1):

$$\% TS = \frac{\text{weight of the residue}}{\text{weight of the sample}} * 100 \quad (1)$$

Figure 1:
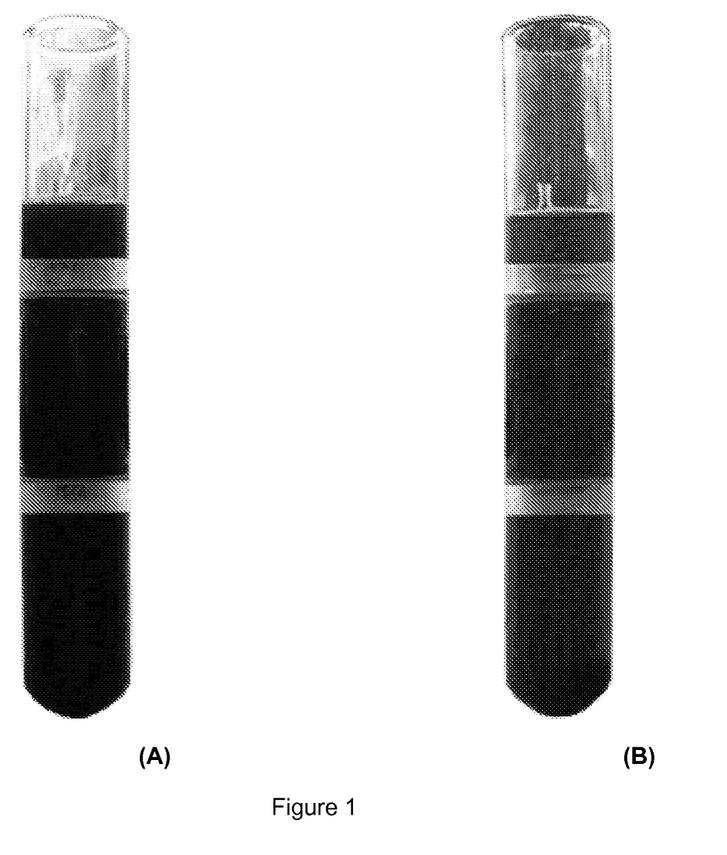
FIG. 1 presents a photograph of untreated vinasse (A) and of the clarified obtained via vinasse treatment through the invention procedure (B).

For the two best removals in total solids, COD, TOC, and turbidity measurements were made. Untreated vinasse has 23% of total solids, pH of 4.3, and conductivity of 28.4 mS/cm. Table 4 shows results of conductivity, % RTS, and the S/N ratio for the percentage of total solid removal. FIG. 1 shows a photograph of untreated vinasse (A) and the clarified obtained by treating the vinasse through the invention procedure (B), revealing a reduction above 90% of the turbidity of the contaminated liquid medium.

TABLE 4

| | Results obtained of % RTS from vinasse | | | |
|---|---|---|---|---|
| | Conductivity (mS/cm) | | | Ratio |
| Test | Clarified | Foam | % RTS | S/N |
| (1) | 34.7 | 35.2 | 28.3 | 29.0 |
| (2) | 35.7 | 39.2 | 44.8 | 33.0 |
| (3) | 39.1 | 39.8 | 38.4 | 31.7 |
| (4) | 27.8 | 28.4 | 24.3 | 27.7 |
| (5) | 39.0 | 40.0 | 41.1 | 32.3 |
| (6) | 37.7 | N.E | 43.4 | 32.8 |
| (7) | 22.2 | 37.1 | 33.1 | 30.4 |
| (8) | 36.5 | 38.3 | 49.4 | 33.9 |
| (9) | 38.2 | 40.1 | 48.4 | 33.7 |

Figure 2:
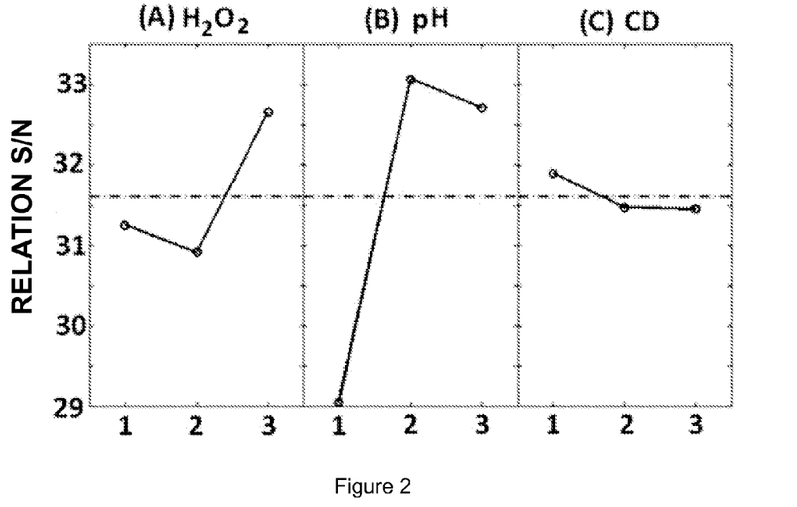
FIG. 2 presents the ratio S/N for each of the variables and levels and its effect on the percentage of removal of total solids.

To obtain the conditions favoring the treatment of vinasse through this electro-coagulation—electro-flotation process using the Taguchi method, it is necessary to calculate the signal noise (S/N) ratio for each experimental run, since it is of interest to have a greater percentage in the removal of total solids; for such, the greater=best characteristic is employed, which is given by:

$$S/N = -10 * \text{Log}\left(\frac{1}{n}\sum_{i=1}^{n}\frac{1}{Y_i^2}\right)$$

Where $Y_1^2$ are the experimental values measured of the percentage of removal of total solids. The Taguchi method recommends a graph of the S/N ratio for each level of every factor to more easily visualize the influence of each factor on the response variable; this as a replacement of the analysis of variance (ANOVA). FIG. 2 shows the effect of each parameter for the percentage of removal of total solids. The S/N ratios indicate that the most significant variable is current density (C) and that the optimal combination of levels for the confirming test is: level 3 for variable (A), level 2 for variable (B), and level 1 for variable (C), this test belongs to the design suggested in point (B) (60,000 ppm of $H_2O_2$, pH 7, and 20 mA/cm$^2$).

From the analysis of variance applied to the design suggested, it is established that the initial pH variable (B) has the greatest influence on the percentage of removal of total solids, followed by the concentration of $H_2O_2$ (A), while current density (C) has little influence on the response variable, as indicated by the S/N ratio in FIG. 2.

Figure 3:
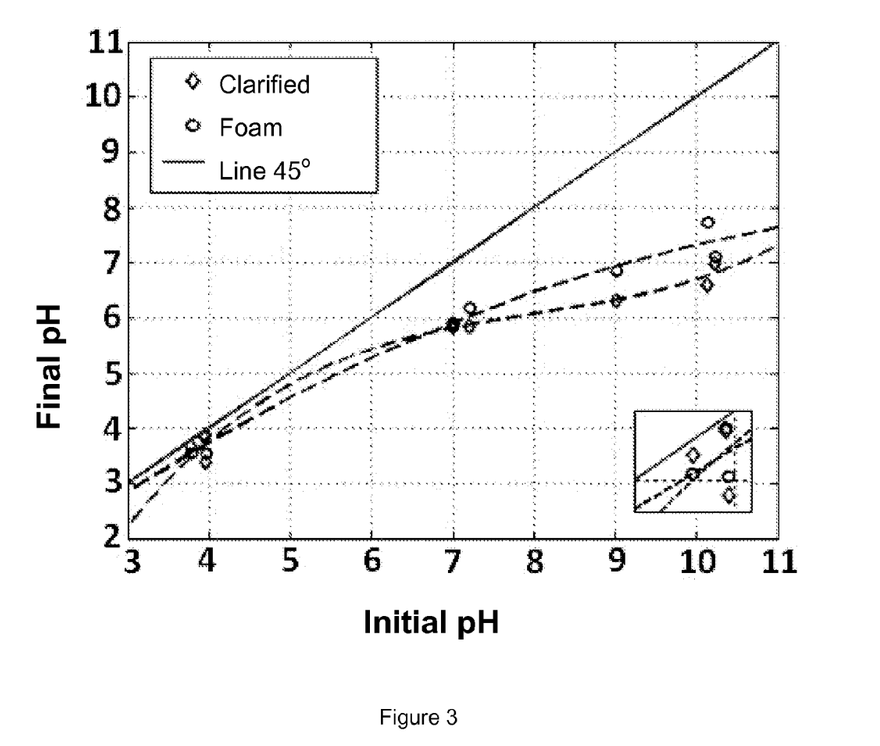
FIG. 3 presents the behavior of the final pH of the solution of vinasse treated through the invention procedure.

The behavior of the final pH of the clarified solution and the foam is presented in FIG. 3, where greater reduction of pH can be observed when working in alkaline conditions than when working under acid conditions. This suggests the existence of a high formation of iron hydroxides that depend on the amount of metal detached from the sacrifice anode and that at values of basic pH species of heavier complexes are formed. In alkaline conditions, high removal of COD is obtained implying the effectiveness of the formation of basic complexes or compounds and their elimination by flotation.

Figure 4:
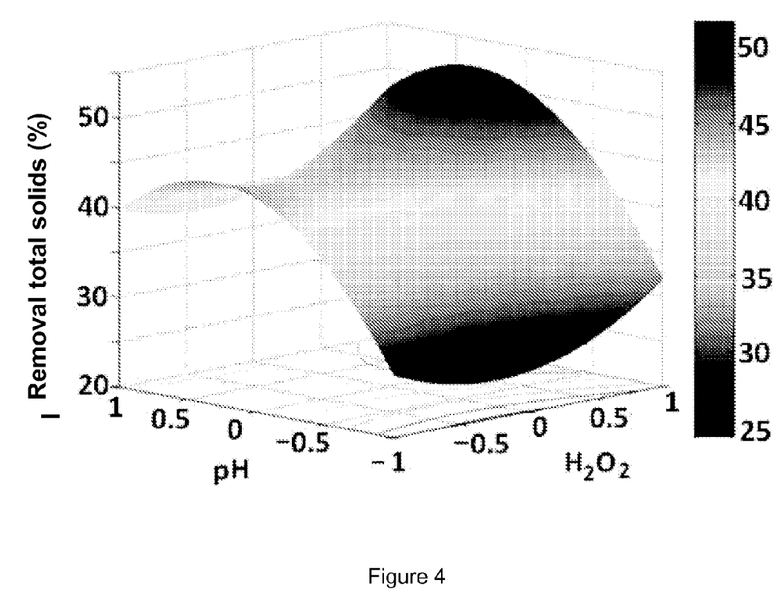
FIG. 4 presents the response surface (% RTS) for the invention process at a current density of 20 mA/cm² in function of pH and the concentration of $H_2O_2$.

Although the current density is the least influencing variable in the removal of total solids, such determines the amount of metallic ions passing to the solution. FIG. 4 shows the response surface for a current density of 20 mA/cm$^2$—a condition where the maximum removal of total solids was obtained.

The conditions that favor removal of total solids correspond to high concentrations of hydrogen peroxide and values of basic pH. For current densities of 40 mA/cm$^2$ and 60 mA/cm$^2$, the conditions that favor removal of total solids are equal, but lower percentages of removal of total solids are obtained because the efficiency of the current diminishes as current is increased.

Figure 5:
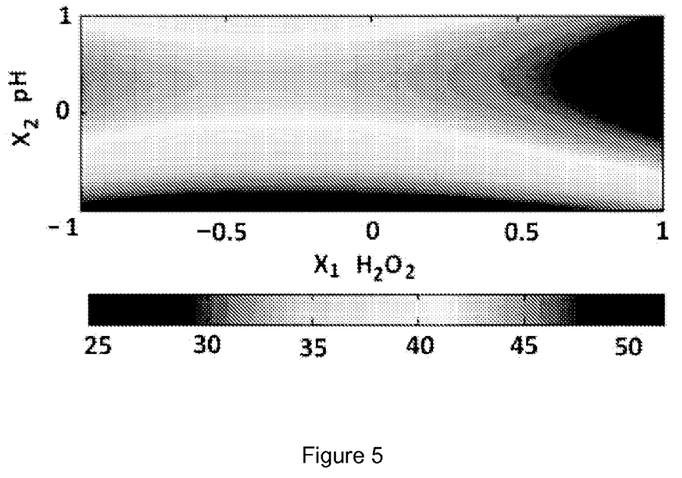
FIG. 5 presents the optimal working conditions DC=20 mA/cm² for the invention process in function of pH and the concentration of $H_2O_2$.

The optimal for obtaining greater percentage of removal of solids is more easily observed on the contour map and in FIG. 5 this region is shown in intense red.

Table 5 shows results in percentages de total solids, turbidity, TOC, and COD and their removal percentages in samples 8 and 9.

TABLE 5

Percentages of removal of TS, TOC, turbidity, and COD

| | | | | Variables | | | | |
|---|---|---|---|---|---|---|---|---|
| Sample | % TS | % RTS | TOC (ppm) | % RTOC | Turbidity (NTU) | % RT | COD (ppm) | % RCOD |
| (8) | 11.6 | 49.4 | 60,460 | 24.6 | 52.5 | 92.3 | 169,177 | 21.1 |
| (9) | 11.9 | 48.4 | 34,400 | 57.1 | 45 | 93.4 | 83,333 | 61.2 |

From the results obtained, it can be concluded that for the reduction of COD, TOC, turbidity, and total solids in vinasse, it may be necessary to use high concentrations of $H_2O_2$ in basic conditions (near 9-10) and low current densities (close to 20 mA/cm$^2$).

The results of these tests evidence the effectiveness of the use of galvanized steel as material for the electrodes, obtaining percentages of removal in total solids near 63%, in TOC of 57%, in turbidity near 93%, and 61% in COD.

The galvanized steel applied as electrode material in the ECF processes applied to vinasse results effective because it permits high removal of COD, TOC, and turbidity; furthermore, it is an economical and easily obtained material compared to electrodes fabricated from more complex alloys. The use of low current densities would favor the consumption of energy in the process. The low values of both initial pH of the solution and concentration of hydrogen peroxide economically favor the operation, managing considerable removal of TOC and COD.

Although the current invention has been described with the preferred embodiments shown, it remains understood that the modifications and variations preserving the spirit and scope of this invention are considered within the reach of the claims included.

The invention claimed is:

1. A process to reduce COD, TOC, and total solids in vinasse from ethanol distilleries, comprising the stages of:
   a) Feed with a contaminated medium from ethanol distilleries a electrolytic cell outfitted with treatment chamber, an input, an output, one or more electric energy conducting media, a power source, a rheostat device, a collection system of the supernatant, and an agitation system;
   b) Adjust the pH of the contaminated liquid medium at a value between 7 and 14;
   c) Maintain said contaminated liquid medium at room temperature;
   d) Apply a constant current through said electrodes at a density between 20 and 40 mA/cm$^2$ to said contaminated liquid medium;
   e) Inject a solution of liquid hydrogen peroxide to said contaminated liquid medium via continuous or sequential injection in a plurality sites next to said electrodes in a concentration between 10 and 67,000 ppm of $H_2O_2$ per liter of contaminated liquid medium;
   f) Remove the treated effluent from said electrolytic cell;
   g) Conduct a post-treatment stage to the effluent, in which said purified effluent is separated from the flocculated and insoluble particles through gravity, filtration, or centrifuge.

2. A process to reduce COD, TOC, and total solids in vinasse from ethanol distilleries according to claim 1 wherein said electrolytic cell comprises as electric energy conducting media one or more pairs of electrodes of galvanized steel placed vertically in the treatment chamber of said electrolytic cell.

3. A process to reduce COD, TOC, and total solids in vinasse from ethanol distilleries according to claim 1 wherein said stage (b) the pH of the contaminated liquid medium is adjusted to a value between 9 and 11.

4. A process to reduce COD, TOC, and total solids in vinasse from ethanol distilleries according to claim 1 wherein said stage (e) the concentration of hydrogen peroxide injected to said contaminated liquid medium is between 1000 and 67,000 ppm of $H_2O_2$ per liter of contaminated liquid medium.

5. A process to reduce COD, TOC, and total solids in vinasse from ethanol distilleries according to claim 1 wherein the reduction in the COD, TOC, and total solids of the contaminated liquid medium is greater than 60%.

6. A process to reduce COD, TOC, and total solids in vinasse from ethanol distilleries according to claim 1 wherein the reduction in the turbidity of the contaminated liquid medium is greater than 90%.

* * * * *

UNITED STATES PATENT AND TRADEMARK OFFICE
CERTIFICATE OF CORRECTION

PATENT NO. : 8,425,755 B2  
APPLICATION NO. : 13/133227  
DATED : April 23, 2013  
INVENTOR(S) : Machuca Martinez et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 53 days.

Signed and Sealed this
Eighth Day of September, 2015

Michelle K. Lee
*Director of the United States Patent and Trademark Office*